United States Patent [19]
Ohkawa et al.

[11] 3,849,045
[45] Nov. 19, 1974

[54] EXTRUSION DIE DEVICE

[75] Inventors: Shunjiro Ohkawa, Tokyo; Katsumo Minagawa, Kawagoe, both of Japan

[73] Assignee: Bridgestone Tire Company Limited, Tokyo, Japan

[22] Filed: Sept. 25, 1972

[21] Appl. No.: 291,829

[30] Foreign Application Priority Data
Sept. 29, 1971 Japan.................. 46-75995

[52] U.S. Cl.............................. 425/131.1, 425/462
[51] Int. Cl................................................ B29f 3/04
[58] Field of Search ............ 264/171; 425/131, 145, 425/462, 466, 376

[56] References Cited
UNITED STATES PATENTS

| | | | |
|---|---|---|---|
| 2,096,362 | 10/1937 | Lehman........................ | 264/171 X |
| 2,569,373 | 9/1951 | Fay................................ | 425/131 X |
| 2,686,335 | 8/1954 | Gross............................. | 425/376 |
| 3,099,859 | 8/1963 | Eilersen........................ | 425/131 |
| 3,743,143 | 7/1973 | Barney.......................... | 425/131 X |

Primary Examiner—Andrew R. Juhasz
Assistant Examiner—David B. Smith
Attorney, Agent, or Firm—Waters, Roditi, Schwartz & Nissen

[57] ABSTRACT

An extrusion die device for extruding different kinds of rubber material through a plurality of passages in a die block and a die attached to the front side of the die block to produce a composite tread rubber wherein a movable vane is provided at each position which is spaced from the rear side of the die and where the passages are merged with each other to change the relative amount of the rubber materials.

2 Claims, 7 Drawing Figures

EXTRUSION DIE DEVICE

This invention relates to an extrusion die device which is adaptable for use in extruding different kinds of rubber material. More specifically, this invention relates to an extrusion die device which is suitable for use in producing composite tread rubber from at least two different kinds of rubber material the relative amount of which is easily varied at an optional proportion even in the extrusion.

In such composite tread rubber attached to vehicle tires, the central portion which engages the road is made of an abrasion resistant rubber composition while the side portions attached to the central portion, which extend down over the tire's side wall, are formed from a more weather resistant rubber composition that will resist cracks caused by ozone and flexing. Another important reason for forming composite tread rubber is that the side portions which are thinner than the central portion tend to be overcured during the curing process. Accordingly, the side portions should be made of a rubber compotion resistant to overcure. In the vehicle art, therefore, it is well known that vehicle tires with such the composite tread rubber have excellent durability and high quality.

An extrusion apparatus for making such a composite tread rubber is known by U.S. Pat. No. 3,099,859, dated Aug. 6, 1963, wherein an attaching bracket integrally constructed with a die insert are secured to a die block by bolts. With such a conventional apparatus, however, the die insert must be exchanged wherever it is desired to change the ratio of mixture of the rubber materials. Obviously, in order to effect such exchange, removing and attaching operations of the die insert must be performed, which will not only be time-consuming but also require the preparation of the die insert.

It is an object of the present invention to provide an extrusion die device which does not require such removing and attaching operations of the die insert for exchanging the die insert when the proportion of the different kinds of rubber material is changed.

It is another object of the present invention to provide an extrusion die device which is manually operated to adjust the proportion of the rubber materials even in the extrusion.

It is a further object of the present invention to provide an extrusion die device wherein the proportion of the rubber materials can be observed from the outside of the die device.

It is a still further object of the present invention to provide an extrusion die device wherein the adjacent rubber materials can be firmly attached with each other.

Other objects and advantages of the present invention will appear from the following description of a preferred embodiment.

Figure 1:
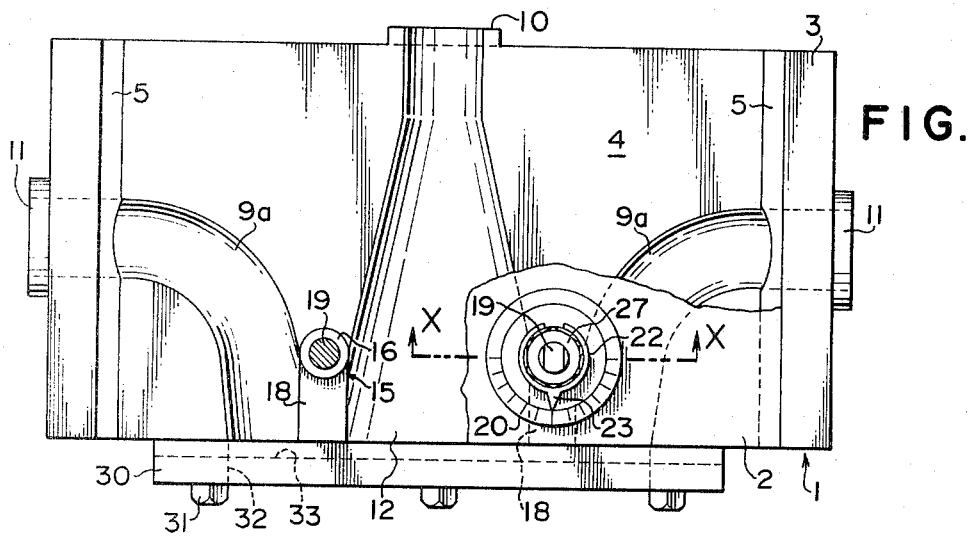
FIG. 1 is a plan view of an extrusion die device in accordance with the present invention, showing a partly removed upper die block section.

Referring now to the drawings, reference numeral 1 designates a die block which includes upper and lower die block sections 2 and 3. The lower die block section 3 is cut away from the rear side thereof to the front side thereof to form a central flat bottom surface 4 and flat inner side walls 5 flared upwardly from both ends of the bottom surface 4. The upper die block section 2 has a flat lower surface 6 and flat side walls 7 flared upwardly from both ends of the lower surface 6. The upper and lower die block sections 2 and 3 are secured to each other by bolts (not shown) after the bottom surface 4 and the inner walls 5 are brought into contact with the lower surface 6 and the side walls 7, respectively. The inner walls 5 of the lower die block section 3 and the side walls 7 of the upper die block section 2 serve to readily locate the sections 2 and 3 when the sections 2 and 3 are bolted together. Complementary channels 8a and 8b are formed in the bottom surface 4 of the lower die block section 3 and the lower surface 6 of the upper die block section 2 in such a manner as to extend along the center line of the die block 1 from the rear side to the front side thereof. The channels 8a and 8b form a central passage 8 when the upper and lower die block sections 2 and 3 are secured to each other. Other complementary channels 9a and 9b are formed in the bottom surface 4 of the lower die block section 3 and the lower surface 6 of the upper die block section 2 in such a manner as to extend at both sides of the channels 8a and 8b from the sides of the die block 1 to the front side thereof. The channels 9a and 9b form side passages 9 when the upper and lower die block sections 2 and 3 are secured to each other. The side passages 9 are merged with a central passage 8 at positions spaced from the front side of the die block 1. The central and side passages 8, 9 have inlet openings 10 and 11 circular in cross-section and an outlet opening 12 rectangular in cross-section, this change in the cross-sectional configuration being gradually made. The inlet openings 10 and 11 are adapted to engage with extrusion passage outlets of conventional arrangements (not shown) which outlets have a circular cross-section similar to that of the inlet openings 10 and 11, such as disclosed, for example, in U.S. Pat. No. 3,099,859. In the present invention, the upper and lower die block sections 2 and 3 may be integrally constructed.

Figure 2:
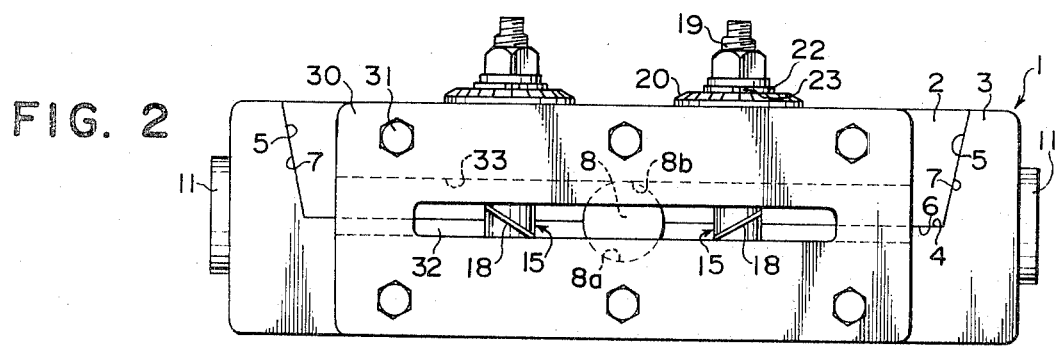
FIG. 2 is a front view of the extrusion die device.
Figure 4:
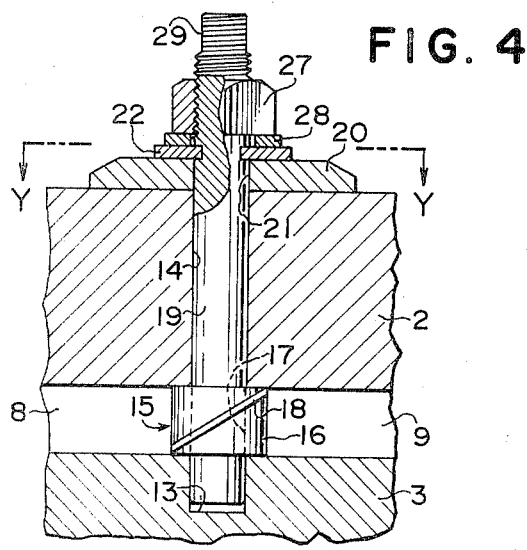
FIG. 4 is an enlarged cross-sectional view taken along the line X—X in FIG. 1.
Figure 3:
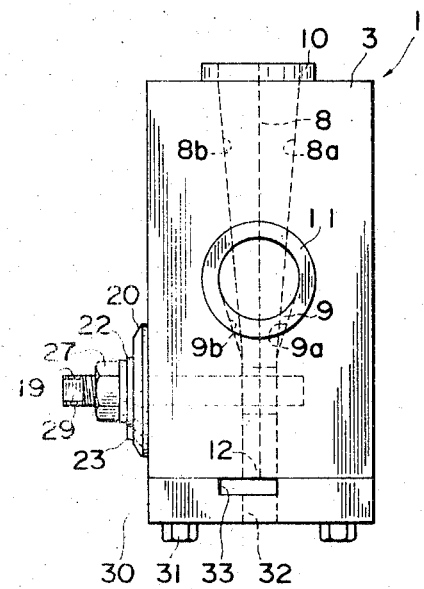
FIG. 3 is a side view of the extrusion die device.
Figure 5:
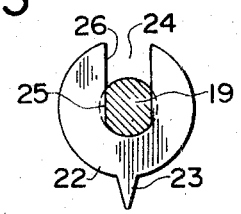
FIG. 5 is a cross-sectional view taken along the line Y—Y in FIG. 4, showing a pointer plate.
Figure 6:
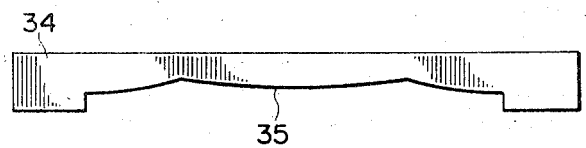
FIG. 6 is a plan view of a die.
Figure 7:
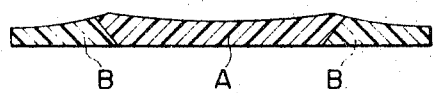
FIG. 7 is a cross-sectional view of a tread rubber extruded by the extrusion die device in accordance with the present invention.

A recess 13 is formed in the lower die block section 3 at each of the junctions of a central passage 8 and side passages 9. A perforation 14 circular in cross-section is formed through the upper die block section 2 in alignment with the axis of the recess 13. A vane member 15 consists of a boss 16 having a perforation 17 circular in cross-section and a vane 18 secured to the side wall of the boss 16 in oblique relationship with the axis of the perforation 17. The vane 18 extends radially of the boss 16 and has a thickness gradually thinner towards the tip of the vane 18. A large oblique angle of the vane 18 with respect to the axis of the perforation 17 results in an increased contact of adjacent different kinds of rubber material so that the rubber materials are brought into tight contact with each other. The side surfaces of the vane 18 may be shaped in the form of zigzag in a direction parallel to the axis of the perforation 17. The oblique angle and the zigzaged form of the side surfaces can be altered by exchanging the vane member 15 depending upon the kinds of rubber material to be extruded. A shaft 19 is rotatably inserted into the perforation 14 of the upper die block section 2 in closely fitted relationship with the perforation 17 of the boss 16 so as to be rotatable with the vane member 15. Furthermore, the shaft 19 has its lower end received by the recess 13, with the vane 18 extending to the front side of the die block 1. The shaft 19 has a length enough to extend above the upper die block section 2 when the recess 13 receives the lower end of the shaft 19. A graduation disc 20 is provided on the upper die block section 2 and has an aperture 21 formed in the center portion thereof, through which the upper end of the shaft 19 is inserted. A pointer piece 22 provided on the graduation disc 20 has a pointer 23 formed on a peripheral portion and an aperture 24 extending from a center portion to a peripheral portion opposing to the pointer 23 as shown in FIG. 5. On the upper end of the shaft 19 and in the same plane as the pointer piece 22 is formed flat cutouts 25 which come into contact with the inner walls 26 of the aperture 24 when the upper end of the shaft 19 is inserted into the aperture 24. The degree of rotation of the shaft 19 and the vane 18 is indicated by the graduation disc 20 and the pointer 23 when the shaft 19 is rotated. A nut 27 is screwed onto the upper end of the shaft 19 with a washer 28 being placed between the pointer piece 22 and the nut 27. Rotation of the shaft 19 is effected by a tool (not shown) which is engaged with flat cutouts 29 formed at the uppermost end portion of the shaft 19. A die support 30 is secured to the front side of the die block 1 by bolts 31 and has an aperture 32 formed in opposing relationship to the outlet opening 12 of the passages 8 and 9. The aperture 32 is formed in substantially the same configuration as that of the outlet opening 12. On the rear side of the die support 30 is formed a groove 33 which extends in parallel with the aperture 32 from one end of the die support 30 to the other end thereof and in opposing relationship to the outlet opening 12 of the passages 8 and 9. The vertical width of the groove 33 is larger than that of the aperture 32 as shown in FIGS. 2 and 3. A die 34 is inserted into the groove 33 and secured to the die support 30 by bolts (not shown) or otherwise. The die 34 has an opening 35 which may be in the form of camelback as shown in FIG. 7 or in any other form as desired.

When two kinds A and B of rubber material are fed into the inlet openings 10 and 11, respectively, the materials A and B are passed through the central passage 8 and the side passages 9 to the tips of the vanes 18 where they are bonded with each other. Thereafter, the materials are extruded through the opening 35 of the die 34 forming a tread rubber as shown in FIG. 7. When the proportion of the materials A and B is changed, a tool is engaged with the flat cutouts 29 to rotate the shaft 19 and the vane 18 after the nut 27 is loosened. When the pointer 23 points to a predetermined position on the graduation disc 20, the shaft 19 is stopped to fasten the nut 27 whereupon the vane 18 is directed towards the appropriate direction to obtain the predetermined proportion of the materials A and B. The outside surface configuration of the extruded material can be altered simply by removing the die 34 from the groove 33 and inserting a new one into the groove 33.

In the present invention, different kinds of rubber material may be passed through the side passages 9 to obtain a tread rubber having a different characteristic to the tread rubber produced by the aforementioned process. Further, another rubber material C can be bonded with the rubber material B at both the sides thereof if other side passages are provided at both the sides of the side passages 9. Plastic material may be extruded by the extrusion die device according to the present invention.

From the foregoing description, it is apparent that the present invention can easily vary the relative amount of the rubber materials even in the extrusion so that the removing and attaching operations of the die insert are not required. Further, the present invention is extremely convenient since when the amount of the rubber materials is adjusted, the adjusting operation is manually effected at the outside of the die device and the degree of the operation is easily observed from the outside of the die device by the graduation disc and the pointer. Still further, the rubber materials are brought into tight contact with each other since the vane is in oblique relationship with the axis of the shaft.

What is claimed is:

1. An extrusion die device for extruding rubber material comprising, in combination, a die block having upper and lower die block sections secured to each other; a die attached to the front side of said die block and in alignment with the contacting line of said upper and lower die block sections; a plurality of passages including complementary channels formed on the upper surface of said lower die block section and on the lower surface of said upper die block section, said complementary channels extending to the rear side of said die and being merged with each other at at least a position spaced from the rear side of said die; a shaft rotatably supported by said upper and lower die block sections at the position where said complementary channels are merged with each other, said shaft extending outwardly of the die block and being manually rotatable at the outer end portion of said shaft; a vane secured to said shaft at said position, said vane extending to the rear side of said die to vary the relative amount of the rubber materials passing through said passages; fixing means for fixing said shaft at a predetermined position with a screw formed on the outer end portion of said shaft and a nut on said screw; graduation means on the external surface of said die block; and a pointer attached to said shaft to indicate the rotational position of said shaft on said graduation means.

2. An extrusion die device as set forth in claim 1 wherein said vane is in oblique relationship with the axis of said shaft.

* * * * *